July 30, 1929.   A. A. GLIDDEN ET AL   1,722,698
LASTING JACK
Filed Oct. 28, 1927
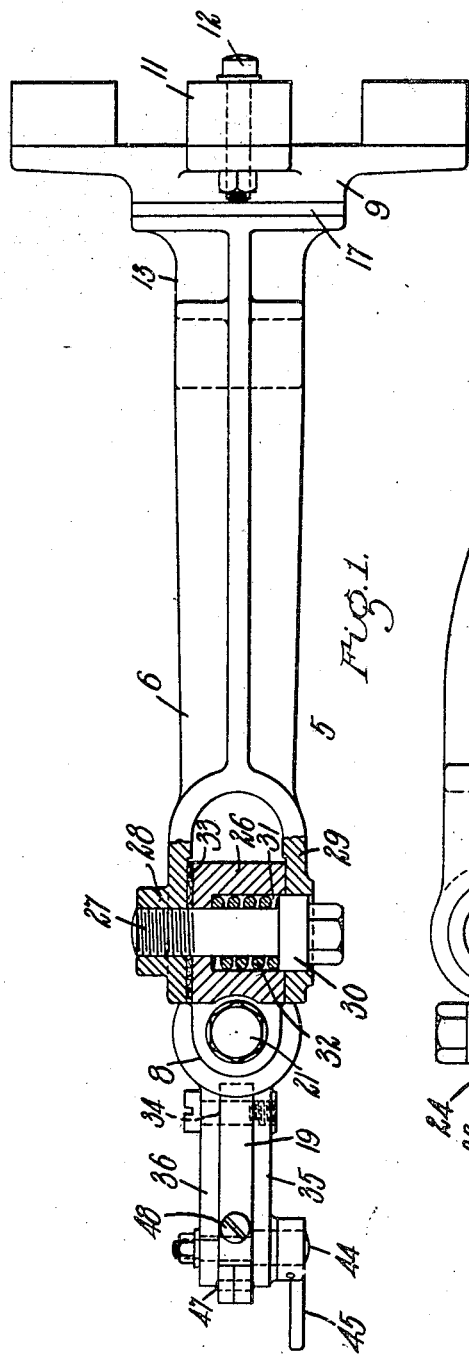

Patented July 30, 1929.

1,722,698

UNITED STATES PATENT OFFICE.

ALFRED A. GLIDDEN AND ARTHUR DRECHSLER, OF WATERTOWN, MASSACHUSETTS, ASSIGNORS TO HOOD RUBBER COMPANY, OF WATERTOWN, MASSACHUSETTS, A CORPORATION OF MASSACHUSETTS.

LASTING JACK.

Application filed October 28, 1927. Serial No. 229,419.

This invention relates to an improved lasting jack.

The object of the invention is to provide a jack which is adjustable, so that the last can be moved into a variety of positions. In other words, the jack is universally adjustable.

The jack of this invention is particularly adapted to be used with an endless conveyer and is illustrated and described in connection therewith in an application by Messrs. Alfred A. Glidden, Thomas M. Knowland and Lawrence H. Burnham on method of manufacturing footwear and apparatus therefor, filed of even date herewith.

The invention consists of a lasting jack, or holder for a last, such as hereinafter described in the specification and particularly as pointed out in the claims.

Referring to the drawings:—

Figure 1 is a plan view, partly in section, of our improved lasting jack.

Fig. 2 is a sectional elevation of the same, showing a last positioned on the jack.

Like numerals refer to like parts in the views of the drawings.

In the drawings, the jack 5 consists of an arm 6, a holder 7, a connecting member 8, and a base 9. The arm 6 is mounted to rock upon a horizontal stud 10 which has screw-threaded engagement with the base 9, the base 9 being fastened to a support 11 by bolts 12. A hub 13 encircles the stud 10 and is provided with a recess 14, in which is positioned a spring 15, one end of which bears against the bottom of said recess and the other end bearing against a flange 16 on the stud 10. Between the hub 13 and the base 9 is a friction washer 17, so that by turning the stud 16 the pressure of the spring 15 may be increased or diminished, and the friction of the hub against the washer 17 may thus be also increased and the frictional resistance to rotation or rocking of the arm 6 may be adjusted.

The last holder 7 embodies a pair of jaws 18 and 19, the jaw 18 being fastened by a screw 20 to a stud 21 having screw-threaded engagement with the upper end of said jaw 18. The connecting member 8 has rotatably mounted therein the stud 21 and is provided with a recess 22 in which is positioned a spring 23 which bears at its lower end against the bottom of said recess 22 and at its upper end against a flange 24 on the stud 21. Between the connecting member 8 and the upper end of the jaw 18 is interposed a friction washer 25. By rotating the stud 21 the tension on the spring 23 may be increased or diminished, thus regulating the frictional resistance to displacement of the last holder 7 upon the connecting member 8.

The connecting member 8 is provided with an ear 26 which is mounted to rock upon the stud 27 having screw-threaded engagement with one jaw 28 of the bifurcated end of the arm 6, the other jaw 29 of said bifurcated end forming a support for a flange 30 on the stud 27. The ear 26 is provided with a recess 31 in which is positioned a spring 32, one end of which bears against the bottom of said recess, and the other end of which bears against the flange 30, and by turning the stud 27 the tension on the spring 32 can be increased or diminished, thus pressing the ear 26 with greater or less force against a friction washer 33 interposed between the jaw 28 and the ear 26, and thus the frictional resistance to displacement of the connecting member 8 upon the arm 6 may be adjusted.

The jaw 19 of the last holder 7 is pivoted at 34 between two arms 35 and 36 extending laterally from the jaw 18, and the arms 37 and 38 of a spring 39 bearing against the jaws 19 and 18 respectively and holding them apart. These jaws are provided on their outer edges with teeth or serrations 40 which bear against the walls of a bore 41 provided in the top of the last 42. The teeth 40 may be forced against the walls of the bore 41 with a positive pressure by an eccentric 43 fast to a rock shaft 44, which is mounted to rock in the arms 35 and 36 on the holder 7 and has a handle 45 fast thereto, by means of which it may be rocked. The eccentric 43 bears against a plate 46 which is pivoted at 47 to the jaw 18 of the holder and can be adjusted downwardly by an adjusting screw 48. Thus by rocking the eccentric 43 by means of the handle 45, the jaws 19 and 18 may be operated to positively grip the wall of the bore 41 in the last 42.

The lower ends of the jaws 18 and 19 are tapered inwardly at 18' and 19' respectively, so that when the last is being placed upon the holder 7, the jaws will be guided into the bore 41.

It will be seen by the construction hereinbefore described that the last 42 placed upon the jaws of the holder 7 may be tipped to any position desired by the operator, that is, the holder 7, embodying the jaws 18 and 19 upon which the last 42 is positioned, may be rocked about a vertical axis 21 and the connecting member 8 may be rocked about a horizontal axis 27, and the arm 6 may be rocked laterally upon a horizontal axis 10. Thus the last may be moved into any desired position.

The frictional resistance to displacement between the different parts of the last hereinbefore described renders it possible to turn or rock the different parts of the jack to different positions, while presenting sufficient resistance to displacement to hold the last in the position to which it may have been turned by the operator.

We claim:

1. A jack for a last having, in combination, a base, an arm rotatable thereon about a horizontal axis, a connecting member rotatable on said arm about a horizontal axis, and a last holder rotatable on said connecting member and embodying a pair of jaws oppositely disposed to each other, the outer edges of said jaws being serrated, and means to move said jaws apart.

2. A last holder for a jack having, in combination, a pair of jaws pivoted to each other, means to yieldingly force said jaws apart, and means to positively force said jaws apart.

3. A last holder for a jack having, in combination, a pair of jaws pivoted to each other, and an eccentric pivotally mounted on one of said jaws and engaging the other jaw, whereby the said jaws may be forced apart.

4. A last holder for a jack having, in combination, a jaw, a bell-crank lever pivoted to said jaw, one arm oppositely disposed to said jaw and constituting a second jaw, and an eccentric pivotally mounted on said first-named jaw and bearing against the other arm of said bell-crank lever, whereby the jaws may be forced apart.

5. A last holder for a jack having, in combination, a pair of jaws oppositely disposed to each other, the outer edges of said jaws being serrated and their lower ends bevelled inwardly, and means to move said jaws apart.

6. A last holder for a jack having, in combination, a jaw, a bell-crank lever pivoted to said jaw, one arm oppositely disposed to said jaw and constituting a second jaw, a plate adjustably mounted on the other of said bell-crank lever arms, an eccentric mounted on said first-named jaw and bearing against said plate, and means to adjust said plate whereby the jaws may be adjusted relatively to each other and forced apart.

7. A jack for a last having, in combination, a base, a stud having screw-threaded engagement with the base, an arm rotatably mounted on said stud, and a spring interposed between said arm and stud and encircling said stud, whereby the tension of said spring may be adjusted by said stud to vary the resistance to rotation of the arm on the base.

8. A jack for a last having, in combination, a base, an arm rotatably mounted on said base, a stud having screw-threaded engagement with said arm, a connecting member rotatably mounted on said stud, and a spring interposed between said stud and connecting member and encircling said stud, whereby the tension on the spring may be adjusted by said stud to vary the resistance to rotation of the connecting member on the arm.

9. A jack for a last having, in combination, a base, an arm rotatably mounted on said base about a horizontal axis, a connecting member rotatably mounted on said arm about a horizontal axis, a last holder, a vertical stud having screw-threaded engagement with said last holder and rotatably mounted upon said connecting member, and a spring interposed between said stud and connecting member and encircling said stud, whereby the tension on the spring may be adjusted by said stud to vary the resistance to rotation of the last holder on the connecting member.

In testimony whereof we have hereunto set our hands.

ALFRED A. GLIDDEN.
ARTHUR DRECHSLER.